United States Patent [19]
Renneker

[11] 3,751,091
[45] Aug. 7, 1973

[54] ENERGY ABSORBING BUMPER SUPPORT
[75] Inventor: Dennis N. Renneker, Warren, Mich.
[73] Assignee: Chrysler Corporation, Highland Park, Mich.
[22] Filed: Aug. 18, 1971
[21] Appl. No.: 172,788

[52] U.S. Cl............... 293/70, 293/85, 267/34, 188/298
[51] Int. Cl............... B60r 19/04, F16f 9/22
[58] Field of Search.............. 188/298, 314, 317; 267/34, 116, 122, 136; 293/DIG. 2, 70, 85, 86, 89; 213/43

[56] References Cited
UNITED STATES PATENTS
2,977,146   3/1961   Edwards et al............. 293/60
3,232,443   2/1966   Smith.......................... 213/8
3,410,416   11/1968  Peterson...................... 213/43
3,542,212   11/1970  Daugherty, Jr............... 213/43
1,572,060   2/1926   Yarnall......................... 267/34

Primary Examiner—Robert G. Sheridan
Assistant Examiner—Robert Saifer
Attorney—George W. Talburtt, Gary L. Newtson et al.

[57] ABSTRACT

Energy absorbing bumper system for an automotive vehicle using two telescoping tubular members with a piston connected by a rod to one member and slideable in the other member. Fluid is sealed in the other tubular member and is forced through valve means in the piston when the pressure of the fluid is increased above a predetermined value due to the application of a force of a predetermined magnitude on the other member, thereby allowing the members to telescope and absorbing energy.

20 Claims, 9 Drawing Figures

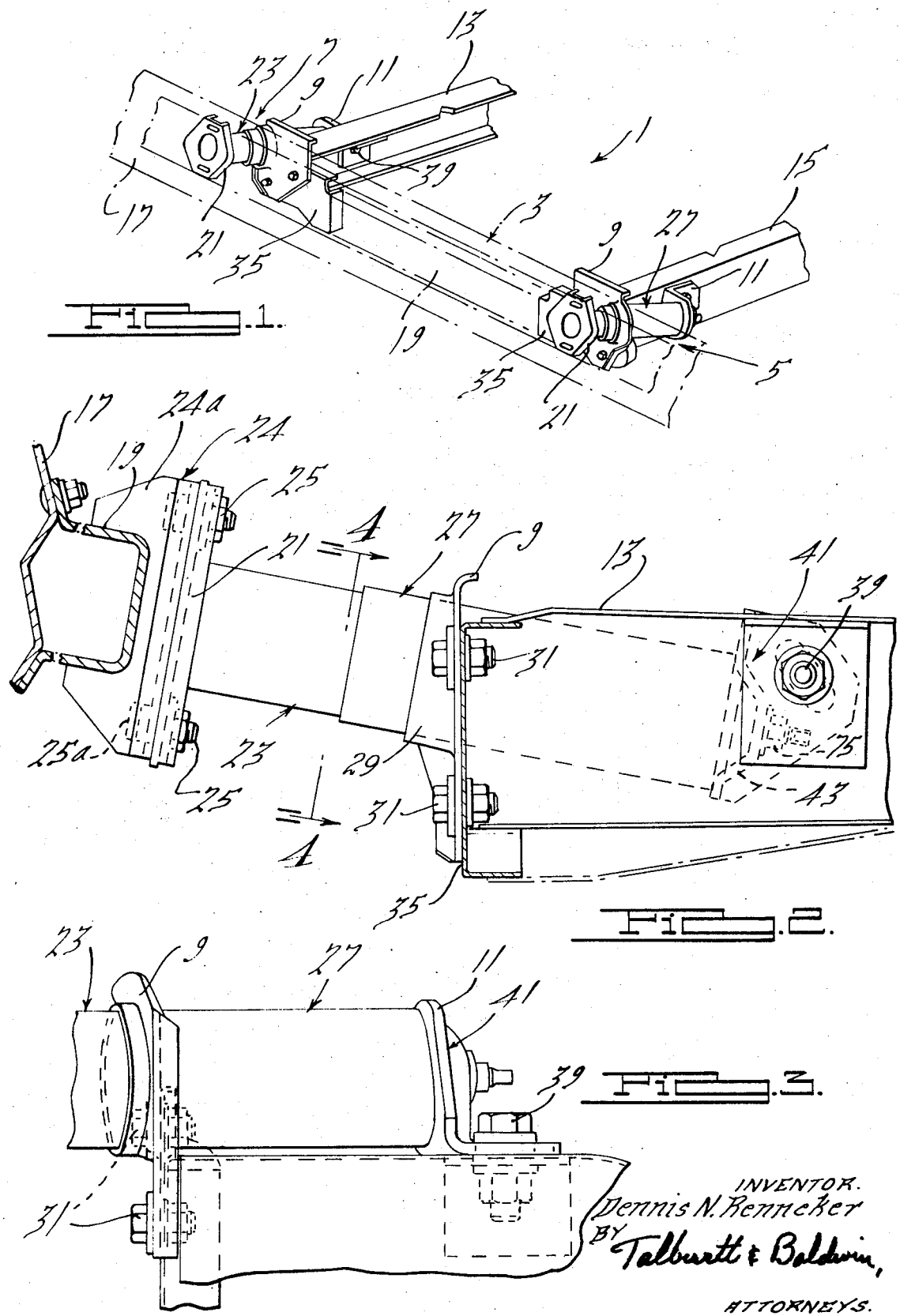

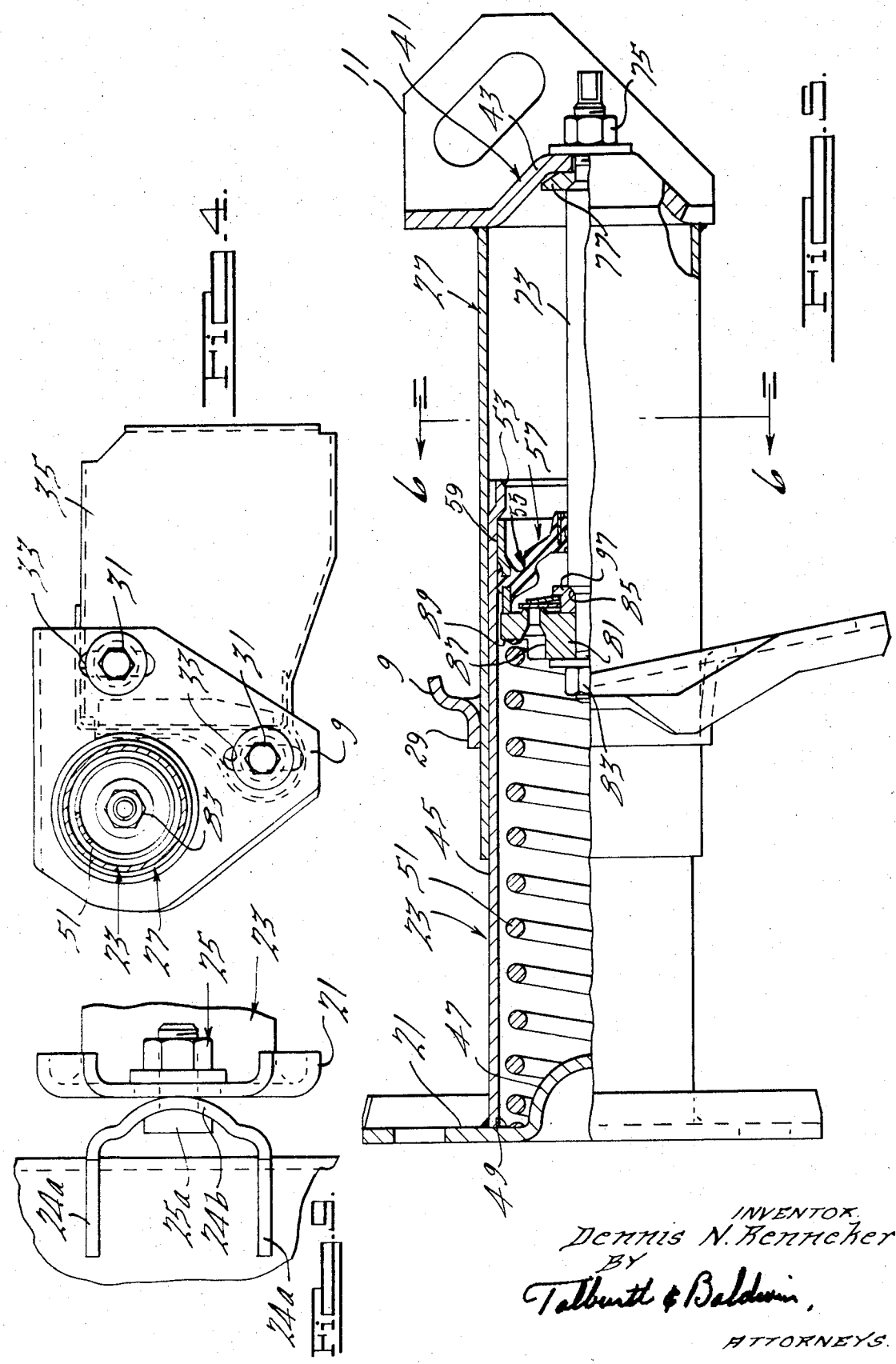

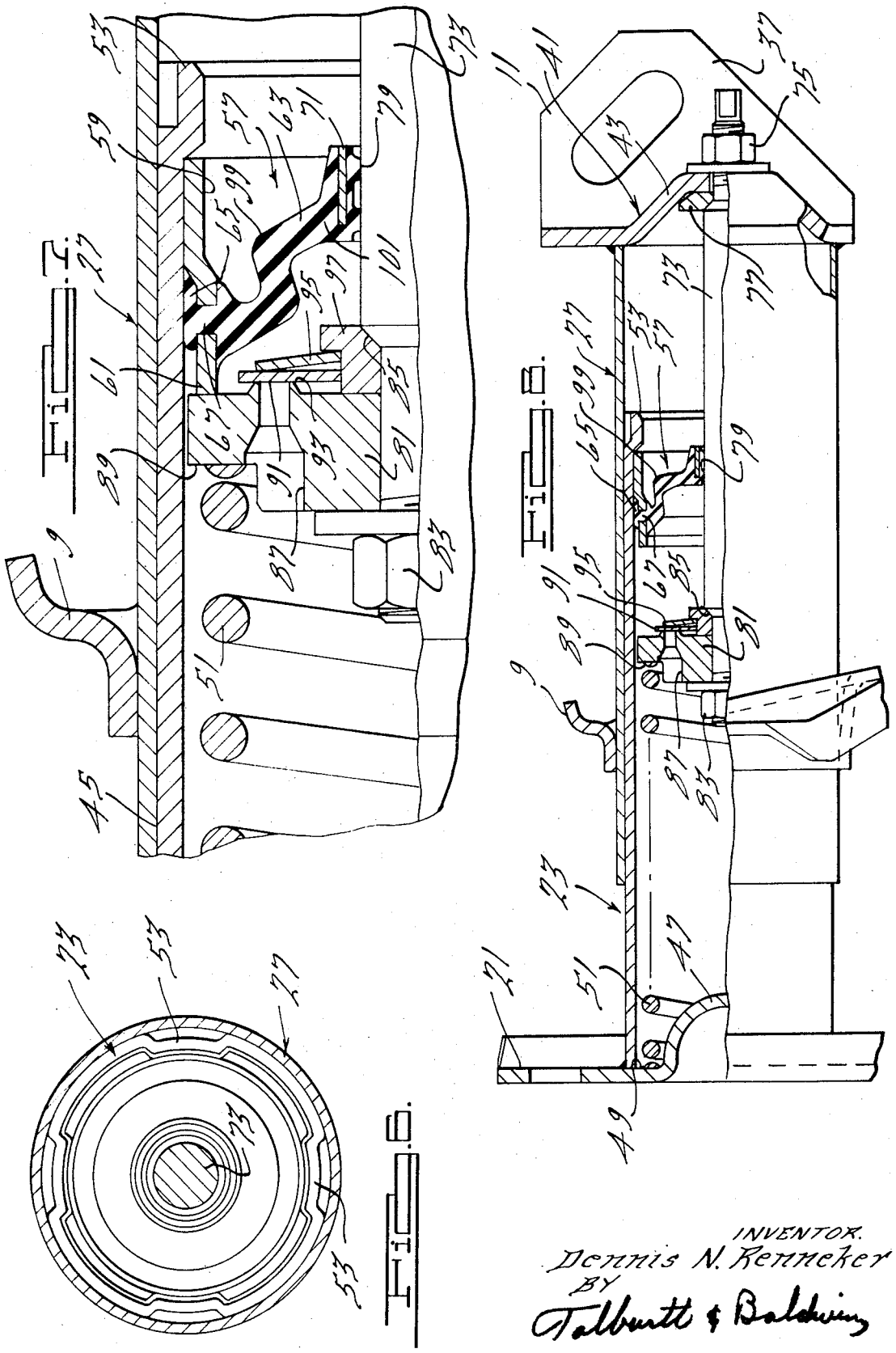

ENERGY ABSORBING BUMPER SUPPORT

BACKGROUND OF THE INVENTION

This invention relates to bumper supports, and more particularly to an energy absorbing support for an automotive vehicle bumper.

There are many different types of automotive vehicle bumpers which are adapted to absorb energy upon impact of the vehicle with another object. In some of these constructions the energy is absorbed by deformation or collapsing energy absorbing devices located on the exterior side of the bumper face bar. Other constructions utilize collapsible face bars for absorbing energy. Still others employ bumper supports between the bumper face bars and the vehicle frame. These bumper supports are adapted to shorten or deform upon impact to absorb energy. These devices may either be non-recoverable after impact, i.e., incapable of being returned to their original condition, or they may be recoverable automatically or by the use of some exterior force, i.e., the devices may return to their original position because some of the impact energy is stored and utilized to later return the device to its original position or they may return as a result of jacking or otherwise forcing them back to their original position. The device of the present invention is adapted to absorb energy upon impact and then automatically return the bumper to its original position after impact.

BRIEF SUMMARY OF THE INVENTION

Briefly, this invention comprises an energy absorbing bumper system having a pair of telescoping tubular members, fluid in at least one of the tubular members, valve means for permitting egress of fluid from one side of a piston in said one tubular member to the other side of the piston in said one tubular member as the members telescope together.

One of the primary objects of this invention is to provide a bumper support device for absorbing energy upon the impact of the bumper with another object.

Another object of this invention is to provide a bumper support of the class described which is adapted to be self-recoverable, i.e., it will automatically return the bumper to its original position after absorbing energy.

A further object of this invention is to provide a bumper support such as described in which fluid is maintained in one portion of the device until the pressure applied to such fluid is increased to a predetermined point, at which point the fluid is permitted to escape through a piston.

Another object of this invention is to provide a bumper support of the type described which is economical in construction and efficient in application.

Other objects and advantages will be made apparent as the description progresses.

BRIEF DESCRIPTION OF THE DRAWINGS

In the drawings, in which one of various possible embodiments are shown,

FIG. 1 is a perspective view of two bumper supports constructed in accordance with this invention, the supports being connected to a bumper shown in broken lines and to frame members;

FIG. 2 is an enlarged side elevation of a bumper support, bumper and frame member shown in FIG. 1;

FIG. 3 is a fragmentary plan view of FIG. 2;

FIG. 4 is a section taken generally along line 4—4 of FIG. 2;

FIG. 5 is an enlarged side elevation of the bumper support, certain parts being removed and shown in section, the various parts of the support being in one position relative to one another;

FIG. 6 is a section taken along line 6—6 of FIG. 5;

FIG. 7 is an enlarged fragmentary view of FIG. 5;

FIG. 8 is a view similar to FIG. 5 showing the various parts of the support in another position relative to one another; and FIG. 9 is a fragmentary plan view of FIG. 2.

Like parts are designated by corresponding reference characters throughout the several views of the drawings.

DESCRIPTION OF THE PREFERRED EMBODIMENT

Referring now to the drawings, an energy absorbing bumper system of this invention is generally indicated at 1 in FIG. 1. As shown, it includes an automotive bumper apparatus 3 and a pair of bumper supports 5 and 7 connected by brackets 9 and 11 to frame members 13 and 15, respectively.

Bumper apparatus 3 includes an elongated face bar 17 extending across a portion or all of the width of the vehicle. The face bar 17 is connected to and mounted on a face bar reinforcement member 19.

The reinforcing member 19 is secured to an end plate or bracket 21 secured or formed on the outer end of a first tubular member 23 of each bumper support 5 and 7 by a bracket 24 having fasteners 25 extending therethrough.

Bracket 24 has two leg portions 24a connected by a curved or cylindrical portion 24b, the innermost surface of which is tangent to the outside face of end plate 21. The heads 25a of fasteners 25 are curved and shaped to mate with the outermost concave surface of portion 24b of bracket 24. As will be made apparent this connection allows the bumper to pivot about one or the other supports 5 or 7, such as may be desired if the bumper receives an impact adjacent only one support. The openings in the bracket 24 for the shanks of fasteners 25 are slightly larger than the shanks to facilitate the pivoting movement about the supports.

Tubular member 23 is slidingly received in a second tubular member 27 of each bumper support secured by brackets 9 and 11 to the respective frame members 13 and 15. As shown, each bracket 9 has a collar 29 which surrounds the tubular member 27. Fasteners 31 extend through slots 33 in bracket 9 for securing the bracket to the outer face 35 of the respective frame members 13 or 15. Bracket 11 has a flange or ear 37 located adjacent the side of the respective frame member and secured thereto by a fastener 39. Bracket 11 includes a portion 41 which forms an end face 43 for the tubular member 27.

As mentioned above, tubular member 23 is slideably and telescopingly received within tubular member 27. Either or both members 23 and 27 may be provided with a coating 45 of layer or coating of material, such as nylon, for example, on their adjacent surfaces to facilitate sliding of tubuler member 23 relative to tubular member 27.

The end face 21 of tubular member 23 has an indentation 47 forming a circular seat 49 therearound against which one end of a coil spring 51 is engaged.

The other end of tubular member 23 is provided with a plurality of crimped-in portions 53 around the peripheral edge thereof. These crimped-in portions 53 prevent the removal of a seal assembly 55.

Seal assembly 55 includes a ring 57 having a first portion 59 adjacent crimped-in portions 53 having an outer diameter approximately equal to the inside diameter of tubular member 23. A second portion 61 has an outer diameter which is slightly smaller than the outside diameter of portion 59, thereby providing an annular space 62.

A flexible displacement annular seal 63 is formed to have an integrally molded ring 65 around the periphery thereof. The ring 65 is connected by necks 67 to the remainder of the seal. The purpose of this ring is to provide a static seal to the inside surface of tubular member 23.

The inner peripheral portion of seal 63 has a confining ring 71 embedded therein for holding the seal around a piston rod 73. Piston rod 73 is secured at one end to the end face 43 of bracket 11 by a nut 75 and washer 77 assembly. Rod 73 extends through the central opening 79 in seal 63 and has a piston 81 connected at its other end by a nut and washer assembly 83. The periphery of the piston is spaced slightly from the inside wall of the tubular member 23 for a purpose to be made apparent hereinafter.

Piston 81 is clamped by the nut and washer assembly 83 against a shoulder 85 on rod 73. A plurality of ports 87 extend through piston 81 inside the shoulder 89 against which one end of spring 51 is biased. An annular plate valve 91 is biased against seats 93 formed on the outlet ends of ports 87 by a valve spring 95 reacting against a spacer 97 connected to piston 81. The tubular member 23 between seal assembly 57 and end face 49 is filled with fluid, such as oil.

As mentioned previously, seal 63 is flexible and in this regard includes an annular section 99 between the neck portions and the beaded radially inward section 101 in which ring 71 is embedded. This section 99 has a combined radial and axial dimension which is greater than it needs be to permit the section to assume an expanded position for accommodating the volume of fluid displaced by piston rod 73 as the latter moves relatively into the tubular member 23.

Operation of the apparatus is as follows:

As the bumper face bar 17 engages another relatively moving object, the force of impact is directed to the frame members 13 and 15 through the bumper supports 5 and 7. Naturally, the forces must be of a predetermined magnitude before the bumper supports will begin to shorten. However, with regard to one bumper support, if the force applied to the end face or bracket 21 is of a predetermined magnitude, the force of spring 51 will be overcome and the spring will begin to be compressed. As the end face 21 tends to move to the right the pressure of the fluid in tubular member 23 between the end face 21 and the valve plate 91 is increased to the point at which spring 95 can no longer hold the plate 91 securely against seats 93. Thus, the valve opens and fluid is forced through the ports 87 in relatively stationary piston 81.

As the tubular member 23 is forced into tubular member 27 the piston 81 and piston rod 73 move relatively into member 23. The movement of rod 73 into the member 23 displaces fluid which is accommodated by the movable section 99. This section moves from the position shown in FIG. 5 to the position shown in FIG. 8 as the tubular members telescope. Energy is absorbed as the fluid is forced through the ports 87 and past the valve 91. Fluid is also forced past the peripheral edge of the piston since the latter does not have a completely sealed fit with the inside wall of the tubular member 23.

Naturally, as the tubular members telescope, the spring 51 is compressed and stores energy. This energy is used to return the tubular members to their original positions after the members have been telescoped during impact. The return of the members 23 and 27 is substantially immediate and automatic. As the spring forces the piston back to its original position fluid is forced around the periphery of the piston from the right side thereof as viewed in FIG. 8 to the left side thereof.

It will be seen that the flexible seal allows the fluid to be displaced by the rod 73 during telescoping to be accommodated within the tubular member 23. The portion of the seal on rod 73 slides along the same during the telescoping movement.

As set forth briefly earlier, if the bumper receives an impact adjacent one of the bumper supports 5 or 7, the connection between such support and the remaining bar permit the bumper to pivot about the other support. The concave cylindrical portion 24b of the bracket 24 slides on the head 25a of the associated fasteners so that the pivot axis is generally along the line of tangency between the cylindrical portion 24b of the bracket 24 and the face of bracket 21.

In view of the foregoing the several objects and other advantages of this invention will be seen.

Although only one embodiment of the invention has been disclosed and described, it is apparent that other embodiments and modifications of the invention are possible.

I claim:

1. An energy absorbing bumper support for connecting an automotive vehicle bumper means to the vehicle frame means, said bumper support comprising a first tubular member adapted to be connected to one of said means, a second tubular member adapted to be connected to the other of said means, said first tubular member being telescoped and slideable in said second tubular member, said first member being closed at one end and having a flexible seal adjacent its other end, fluid in said first tubular member, a piston in said fluid, a piston rod connected to said piston and extending through said seal and connected to one end of said second tubular member, means slideably and sealingly engaging said piston rod, a coil spring biasing said piston and said one end of said first tubular member apart, said piston having at least one passage therethrough, movable valve means attached to said piston and normally closing said passage, said valve means opening to permit fluid to flow through said passage and said first tubular member to telescope into said second tubular member when the pressure of the fluid in said first tubular member is increased as a result of the application of an externally applied force of a predetermined magnitude to said one end of said first tubular member, said piston rod sliding through said seal as said tubular members telescope.

2. An energy absorbing bumper support as set forth in claim 1 wherein said seal includes a flexible ring-shaped section, said means slideably and sealingly engaging said piston rod including an enlarged beaded section on the inner edge of said flexible section, a reinforcing ring embedded in said beaded section, said beaded section sealingly and slidingly engaging said piston rod.

3. An energy absorbing bumper support as set forth in claim 1 wherein said seal includes a flexible ring-shaped sealing member surrounding said piston rod, said sealing member being adapted to assume a position in which the total volume between said seal and said one end of said first tubular member is enlarged to accommodate the displacement of fluid caused by movement of said piston rod into said first tubular member.

4. An energy absorbing bumper system for an automotive vehicle having frame means comprising an elongated face bar, reinforcement means for supporting and reinforcing said face bar, at least two bumper supports connecting said reinforcement means to said frame means, each bumper support including first and second tubular members having a telescopic relationship with one another, a piston rod connected at one end to one of said tubular members and extending axially thereof, a piston connected to the other end thereof, at least one passage through said piston, the other of said tubular members containing fluid, valve means in said piston normally closing said passage and adapted to open when the pressure of the fluid thereon reaches a predetermined value, said piston rod relatively moving into the said other tubular member as said tubular members are telescoped together, seal means for inhibiting the egress of fluid from said other tubular member, said seal means having means surrounding and having a sealing and sliding relationship with said piston rod, said seal means further being flexible and adapted to enlarge the total volume within said other tubular member to accommodate the fluid displaced by said rod as the latter enters said other tubular member, and means for biasing said tubular members toward one position relative to one another.

5. An energy absorbing bumper system as set forth in claim 4 wherein said valve means includes an annular valve plate, a seat on the outlet end of said passage, and an annular spring biasing said valve plate toward said seat.

6. An energy absorbing bumper system for an automotive vehicle having frame means comprising an elongated face bar, reinforcement means for supporting and reinforcing said face bar, at least two bumper supports connecting said reinforcement means to said frame means, each bumper support including first and second tubular members having a telescopic relationship with one another, a piston rod connected at one end to said first tubular member and extending axially thereof, a piston connected to the other end of said rod, at least one passage through said piston, said second tubular member containing fluid, valve means in said piston normally closing said passage and adapted to open when the pressure of the fluid thereon reaches a predetermined value, said piston rod relatively moving into the said second tubular member as said tubular members are telescoped together, seal means for inhibiting the egress of fluid from said second tubular member, said seal means having means surrounding and having a sliding and sealing relationship with said piston rod, said seal means further being flexible and adapted to enlarge the total volume within said second tubular member to accommodate the fluid displaced by said rod as the latter enters said second tubular member, and means for biasing said tubular members toward one position relative to one another.

7. An energy absorbing bumper system as set forth in claim 6 further comprising means generally pivotally connecting each of said bumper supports to said reinforcing means.

8. An energy absorbing bumper system as set forth in claim 7 wherein said means generally pivotally connecting each of said bumper supports to said reinforcing means includes a reinforcing bracket having a curved surface, a fastener extending through said reinforcing bracket and connected to said second tubular member, said fastener having a head thereon, said head mating with said curved surface.

9. An energy absorbing bumper system as set forth in claim 6 wherein said valve means includes an annular valve plate, a seat on the outlet end of said passage, and an annular spring biasing said valve plate toward said seat.

10. An energy absorbing bumper system for an automotive vehicle having frame means comprising an elongated face bar, reinforcement means for supporting and reinforcing said face bar, at least two bumper supports connecting said reinforcement means to said frame means, each bumper support including first and second tubular members having a telescopic relationship with one another, a piston rod connected at one end to one of said tubular members and extending axially thereof, a piston connected to the other end thereof, at least one passage through said piston, the other of said tubular members containing fluid, valve means in said piston normally closing said passage and adapted to open when the pressure of the fluid thereon reaches a predetermined value, said piston rod relatively moving into the said other tubular member as said tubular members are telescoped together, seal means for inhibiting the egress of fluid from said other tubular member, said seal means being flexible and adapted to enlarge the total volume within said other tubular member to accommodate the fluid displaced by said rod as the latter enters said other tubular member, and means for biasing said tubular members toward one position relative to one another, said valve means including an annular valve plate, a seat on the outlet end of said passage, and an annular spring biasing said valve plate toward said seat, said seal means including an annular ring portion located adjacent the inside diameter of one of said tubular members, said ring member having a first circumferential portion in contact with the inside surface of said one tubular member and a second circumferential portion spaced radially inwardly from said inside surface, said ring member having a plurality of openings therethrough, a resilient and flexible sealing member having a plurality of relatively small diameter neck portions extending through said openings, enlarged head portions on the radially outer end of said neck portions between said inside diameter and the outside diameter of said second circumferential portion.

11. An energy absorbing bumper system as set forth in claim 10 wherein said seal includes a sealing portion surrounding said piston rod, and a fluid accommodating section extending from said sealing portion to said neck portions, the width of said fluid accommodating section being greater than the distance between said sealing portion and said neck portions, said fluid accommodating section being adapted to assume a position in which the volume of said other tubular member is increased over its normal volume under the influence of the pressure of the fluid in said other cylinder.

12. An energy absorbing bumper system as set forth in claim 11 wherein said valve means includes an annular valve plate and an annular spring biasing said valve plate toward said passage.

13. An energy absorbing bumper system for an automotive vehicle having frame means comprising an elongated face bar, reinforcement means for supporting and reinforcing said face bar, at least two bumper supports connecting said reinforcement means to said frame means, each bumper support including first and second tubular members having a telescopic relationship with one another, a piston rod connected at one end to said first tubular member and extending axially thereof, a piston connected to the other end of said rod, at least one passage through said piston, said second tubular member containing fluid, valve means in said piston normally closing said passage and adapted to open when the pressure of the fluid thereon reaches a predetermined value, said piston rod relatively moving into the said second tubular member as said tubular members are telescoped together, seal means for inhibiting the egress of fluid from said second tubular member, said seal means being flexible and adapted to enlarge the total volume within said second tubular member to accommodate the fluid displaced by said rod as the latter enters said second tubular member, and means for biasing said tubular members toward one position relative to one another, said valve means including an annular valve plate, a seat on the outlet end of said passage, and an annular spring biasing said valve plate toward said seat, said seal means including an annular ring portion located adjacent the inside diameter of said second tubular member, said ring member having a first circumferential portion in contact with the inside surface of said second tubular member and a second circumferential portion spaced radially inwardly from said inside surface, said ring member having a plurality of openings therethrough, a resilient and flexible sealing member having plurality of relatively small diameter neck portions extending through said openings, enlarged head portions on the radially outer end of said neck portions between said inside diameter and the outside diameter of said second circumferential portion.

14. An energy absorbing bumper system as set forth in claim 13 wherein said seal includes a sealing portion surrounding said piston rod, and a fluid accommodating section extending from said sealing portion to said neck portions, the width of said fluid accommodating section being greater than the distance between said sealing portion and said neck portions, said fluid accommodating section being adapted to assume a position in which the volume of said second tubular member is increased over its normal volume under the influence of the pressure of the fluid in said second tubular member.

15. An energy absorbing bumper system as set forth in claim 14 wherein said tubular members each have one surface adjacent the other tubular member, one of said surfaces having a coating of material thereon adapted to facilitate sliding and telescoping movement between said tubular members.

16. An energy absorbing bumper system as set forth in claim 15 wherein said means biasing said tubular members toward one position relative to one another comprises a coil spring, a projection extending toward said piston from one end of said second tubular member, said coil spring surrounding said projection.

17. An energy absorbing bumper system as set forth in claim 16 wherein said second tubular member has a plurality of indentations formed in its open end to prevent removal of said piston therefrom.

18. An energy absorbing bumper system as set forth in claim 17 further comprising a first bracket connected to said second tubular member securing it to said reinforcement means, a second bracket secured to said one end of said first tubular member and connecting it to said frame means, and a third bracket extending around said first tubular member at a point spaced from said second bracket and secured to said frame means.

19. An energy absorbing bumper support for connecting an automotive vehicle bumper means to the vehicle frame means, said bumper support comprising a first tubular member adapted to be connected to one of said means, a second tubular member adapted to be connected to the other of said means, said first tubular member being telescoped and slideable in said second tubular member, one of said members being closed at one end and having a seal adjacent its other end, fluid in said one member, a piston in said fluid, a piston rod connected to said piston and extending through said seal and connected to one end of the other member, means biasing said piston and said one end of said one tubular member apart, said piston having at least one passage therethrough, valve means attached to said piston and normally closing said passage, said passage, said valve means opening to permit fluid to flow through said passage and said first tubular member to telescope into said second tubular member when the pressure of the fluid in said one tubular member is increased as a result of the application of an externally applied force of a predetermined magnitude to said one end of said one tubular member, said seal including a flexible ring-shaped sealing member surrounding said piston rod, said sealing member being adapted to assume a position in which the total volume between said seal and said one end of said one tubular member is enlarged to accommodate the displacement of fluid caused by movement of said piston rod into said one tubular member, said seal including a rigid ring-shaped member adjacent the inside surface of said one tubular member, said rigid ring-shaped member having a first circumferential portion engaging said inside surface and a second circumferential portion engaging said inside surface and a second circumferential portion adjacent said first circumferential portion spaced radially inwardly from said inside surface to provide an annular space, said second circumferential portion having openings therein, said seal further including a flexible sealing member surrounding said piston rod and having neck portions extending through said openings, and a ring portion attached to said neck portions and located in said annular space, said sealing member being adapted to assume a position in which the total volume between said seal and said one end of said one tubular member is enlarged to accommodate the displacement of fluid caused by movement of said piston rod into said one tubular member.

20. An energy absorbing bumper support as set forth in claim 19 wherein said sealing member includes an enlarged beaded section on the inner edge thereof a reinforcing ring embedded in said beaded section, said beaded section sealingly engaging said piston rod.

\* \* \* \* \*